HEUERMANN & REEVES.
Mowing Machine.
No. 15,236.
Patented July 1, 1856.
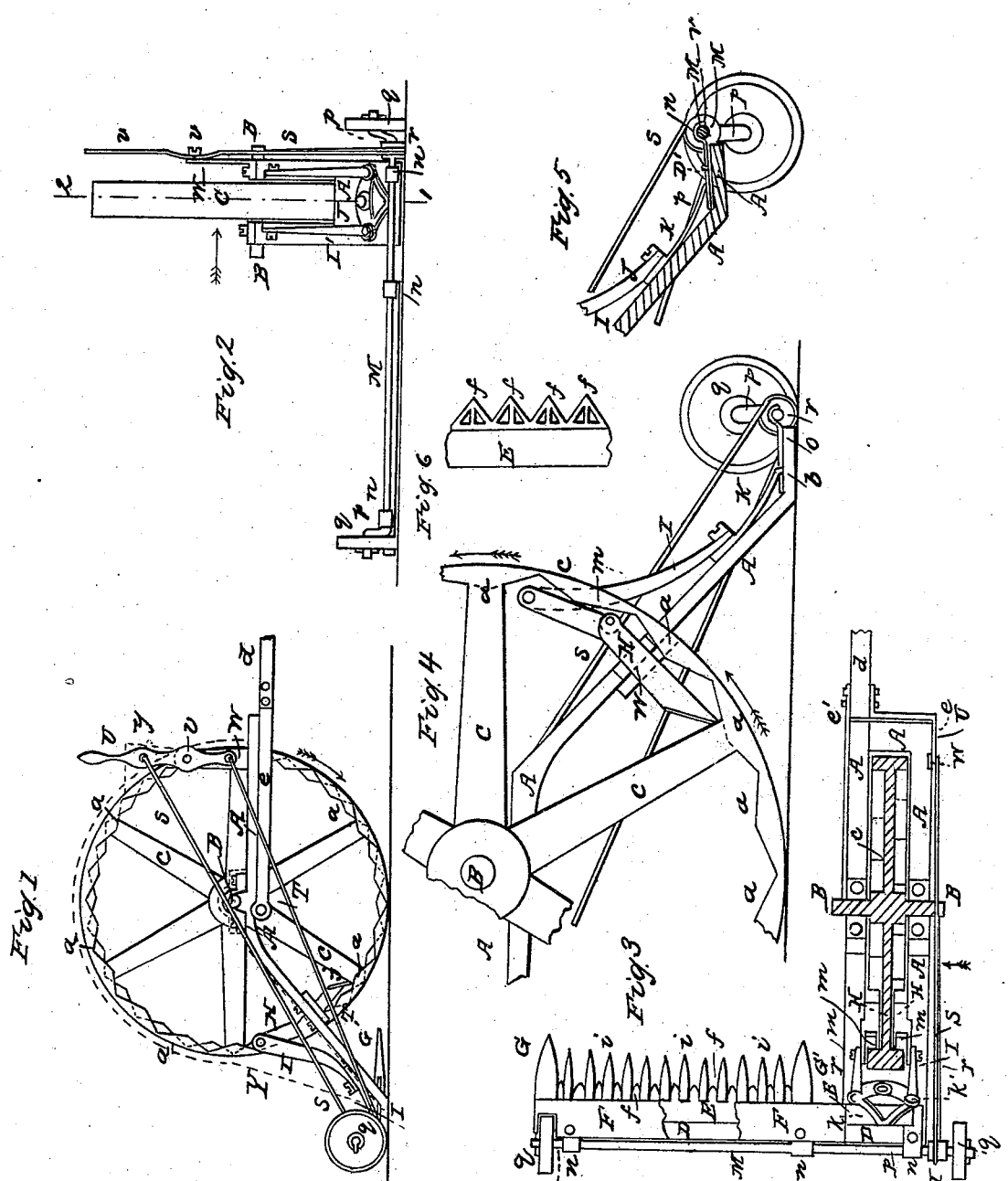

UNITED STATES PATENT OFFICE.

JOHN C. HEUERMANN AND JONATHAN REEVES, OF CAMDEN, NEW JERSEY.

IMPROVEMENT IN HARVESTERS.

Specification forming part of Letters Patent No. 15,236, dated July 1, 1856.

*To all whom it may concern:*

Be it known that we, JOHN C. HEUERMANN and JONATHAN REEVES, of the city of Camden and State of New Jersey, have invented certain new and useful Improvements in Harvesters; and we do hereby declare that the following is a full, clear, and exact description of the same, reference being had to the accompanying drawings, and to the letters of reference marked thereon.

Our invention relates to that class of harvesters in which a series of cams or projections on the driving-wheel are used as a means of agitating the cutters; and it consists in the employment of a driving-wheel having on the inside of its rim a double set of angular projections, the points of one set coinciding with the spaces between the points of the opposite set. In connection with these pointed projections we employ two levers, so arranged and acting in conjunction with each other and with other levers and rods as to agitate the cutters of the harvester and at the same time scrape away any dirt which may collect on the projections inside of the rim. We place at the back of the cutter-bar a shaft having each end cranked and each cranked portion furnished with a roller-wheel. On the straight portion of this shaft is attached a pulley, to which are secured two cords or chains connected to a lever within reach of the driver in such a manner that by operating the said lever the shaft may be so turned as to raise the cutter-bar free from stones and other obstructions.

In order to enable others skilled in the art to make and use our invention, we will now proceed to describe its construction and operation.

On reference to the drawings which form a part of this specification, Figure 1 is an end view, looking in the direction of the arrow, Fig. 3, showing our improvements in harvesters. Fig. 2 is a view looking toward the back of the cutter-bar; Fig. 3, a ground plan of Fig. 1; Fig. 4, a detached sectional view on the line 1 2, Fig. 2, looking in the direction of the arrow, and drawn to an enlarged scale; Fig. 5, a portion of Fig. 4, illustrating the method of raising the cutter-bar; Fig. 6, a detached view of the cutters.

The same letters of reference allude to similar parts throughout the several views.

A is the frame of the machine, on which is hung the axle B of the driving-wheel C. The latter has round the inside of the rim two sets of angular projections, *a a*, one set on each side of the arms, the points of the projections on one side coinciding with the spaces between the points of the projections on the opposite side. The inclined portion of the frame A terminates in a straight piece, *b*, which is secured to the under side of the cutter-bar D, and which rests on the ground. Underneath the frame A, and near the axle B, are two lugs, one on each side of the wheel C, to which are jointed the arms *e* and *e'*, the arm *e* being bent in front of the frame A and terminating in a flange, between which and the end of the arm *e'* is secured the end of the pole *d* for drawing the machine over the ground.

E is the reciprocating bar, to which are secured the cutters *f*, each of the latter having two angular perforations, as seen in Fig. 6. The bar E has on the under side a longitudinal slot, which fits a corresponding projection on the cutter-bar D, so as to maintain the cutters in the same lateral position, and at the same time allow the bar E to slide freely backward and forward in contact with the cutter-bar, to which it is confined by the cover-plate F.

G and G' are the master guard-teeth, and *i i* the fingers, both being secured to the cutter-bar D, and both being too similar to those of ordinary harvesters to need further description.

H and H' are levers having their fulcrums on pins *h h*, secured to the opposite sides of the frame A. The lower arms of these levers terminate in scrapers *j*, of the same width as the angular projections *a a* of the wheel C, and so arranged that the scraper of one lever shall always be in contact with the surface of the angular projections on one side of the wheel and the scraper of the other lever with the surface of the projections on the opposite side of the wheel.

To the extreme end of the upper arm of the lever H is jointed the rod I and to the upper arm of the lever H' the rod I', and the ends of these rods are jointed to the opposite ends of the lever J, which has its fulcrum on the inclined portion of the frame A. From the opposite end of the lever J project two arms, K, and K', meeting together at the end and terminating in two projections, which fit into corresponding slots in the reciprocating bar E.

Both levers H and H' are furnished with rollers m m, turning on pins situated between the fulcrum h and the extreme ends of the said levers, and so arranged that the roller m of one lever shall bear against the surface of the angular projections on one side of the wheel C and the roller m of the other lever against the projections on the opposite side of the wheel.

M is a shaft hung in brackets n n n n, secured to the back of the cutter-bar. Each end of this shaft is cranked at p p, as seen in Fig. 2, and on the end of each cranked portion are hung loose the roller-wheels q q. On the straight portion of the shaft M is secured a pulley, r, to the periphery of which are secured and partially wrapped around the cords or chains S and T, the former being wrapped over and the latter under the pulley r. These cords or chains are connected to the lever V, the fulcrum of which is on a pin, v, projecting from a bracket, W, the latter being secured to the side of the frame A, the center of the fulcrum being midway between the point of connection of the cords S and T with the lever.

The upper portion of the machine as far as the top of the frame A is inclosed in a cover or casing of sheet-iron or other suitable material, (shown in red lines Y, Fig. 1,) and in front of this casing is a seat, y, for the driver, within whose reach projects the handle of the lever V.

Operation: The machine being drawn over the ground by horses attached to the pole d, and the wheel C consequently turned in the direction of the arrow, the angular projections a, acting on the rollers m, will, on account of the position of the two sets of projections in respect to each other, cause the opposite levers H and H' to vibrate in contrary directions, imparting through the rods I and I' a vibrating motion to the lever J and its arms K K and a corresponding reciprocating motion to the bar E with its cutters f. The scrapers j, at the lower end of the levers H and H', are so arranged in respect to the rollers m m that when the latter are at the lowest point between the angular projections a a the scrapers are at the top of another angular projection, and throughout the revolution of the wheel C are always in contact with the surface of the said projections, thus clearing the latter of all sand and dirt which may collect thereon, and which would, if carried upward toward the rollers m m, not only prevent their efficient operations, but would also cause them to be rapidly worn. Should a stone or other obstruction present itself in advance of the cutters, the driver, by turning down the lever V in the direction of the arrow, will pull the cord T, causing the shaft M to turn in the direction of the arrow, Fig. 4, until the cranked portion p assumes the position shown in Fig. 5, thus raising the cutter-bar a sufficient distance above the ground to pass over any ordinary obstructions. By moving the lever V in a contrary direction to that pointed out by the arrow the cord S will, by causing the shaft M to turn in a contrary direction, allow the cutter-bar to resume its former position.

Having now described the nature of our invention and the manner in which the same is carried into effect, we wish it to be understood that we do not claim exclusively the employment of cams or projections on the driving-wheel in combination with levers for agitating the cutters of harvesters; but

What we claim, and desire to secure by Letters Patent, is—

The wheel C, with its projection, in combination with the levers H and H' and their scrapers j, the rods I and I', lever J, and arms K, the whole being arranged and constructed, substantially in the manner herein set forth, for the double purpose of clearing the projections from dirt and agitating the cutters.

JOHN CH. HEUERMANN.
JONATHAN REEVES.

Witnesses:
BENJ. A. LATIMER,
HENRY HOWSON.